United States Patent [19]

Frei

[11] Patent Number: 4,750,685
[45] Date of Patent: Jun. 14, 1988

[54] SAFETY BELT TAKEUP DEVICE WITH TIGHTENING MEANS

[75] Inventor: Bernhard Frei, Waldstetten, Fed. Rep. of Germany

[73] Assignee: TRW Repa GmbH, Alfdorf, Fed. Rep. of Germany

[21] Appl. No.: 906,991

[22] Filed: Sep. 15, 1986

[30] Foreign Application Priority Data

Sep. 24, 1985 [DE] Fed. Rep. of Germany ....... 3534048

[51] Int. Cl.$^4$ ............................................. B60R 22/46
[52] U.S. Cl. ............................ 242/107; 242/107.4 R; 280/806; 192/45; 192/56 R
[58] Field of Search ......... 242/107, 107.4 R, 107.4 A, 242/107.4 B; 192/56 R, 44, 45; 254/DIG. 14, 266, 903; 280/806, 805; 297/478, 480; 464/32, 37

[56] References Cited

U.S. PATENT DOCUMENTS

| 1,942,198 | 1/1934 | Blackstock | 192/56 R X |
|---|---|---|---|
| 2,049,880 | 8/1936 | Winkler | 192/45 X |
| 2,989,857 | 6/1961 | Helland et al. | 464/32 |
| 2,993,544 | 7/1961 | Carlson | 464/32 |
| 3,270,844 | 9/1966 | Orwin | 192/56 R |
| 3,942,338 | 3/1976 | Furlette et al. | 192/56 R X |
| 4,061,291 | 12/1977 | Cunningham | 242/107 |
| 4,120,467 | 10/1978 | Stephenson | 242/107 |
| 4,273,006 | 6/1981 | Woodbury | 464/32 X |
| 4,347,715 | 9/1982 | Carman et al. | 464/32 |
| 4,372,501 | 2/1983 | Inukai | 242/107 |
| 4,423,846 | 1/1984 | Fohl | 242/107 |

FOREIGN PATENT DOCUMENTS 3430871 5/1986 Fed. Rep. of Germany ...... 280/806

Primary Examiner—John M. Jillions
Attorney, Agent, or Firm—Tarolli, Sundheim & Covell

[57] ABSTRACT

The safety belt takeup device with tightening means comprises for transmitting the tightening force to the takeup shaft a rotatable roller (18) couplable to said shaft via a coupling means. At the periphery of the roller (18) the tightening force engages via a wire cable (36). In the force transmission path between the cable (36) and the takeup shaft a limiting means is provided which limits the torque which can be transmitted to the takeup shaft so that towards the end of a tightening operation no inadmissibly high tensile stresses occur in the webbing bearing on the body of the vehicle occupant.

18 Claims, 3 Drawing Sheets

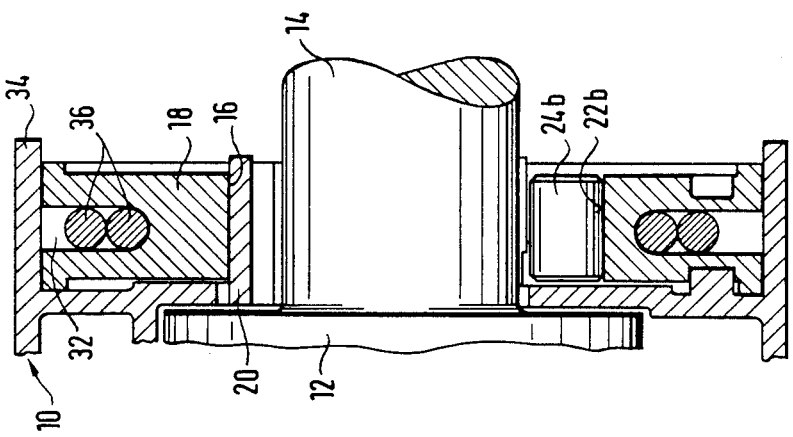
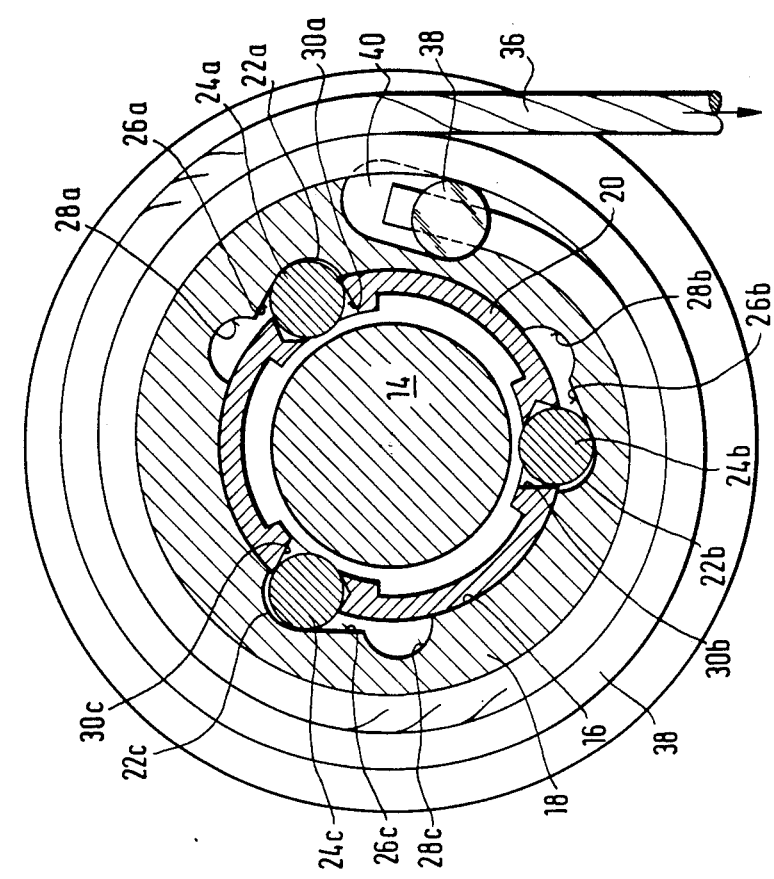

FIG. 5
FIG. 6
FIG. 7
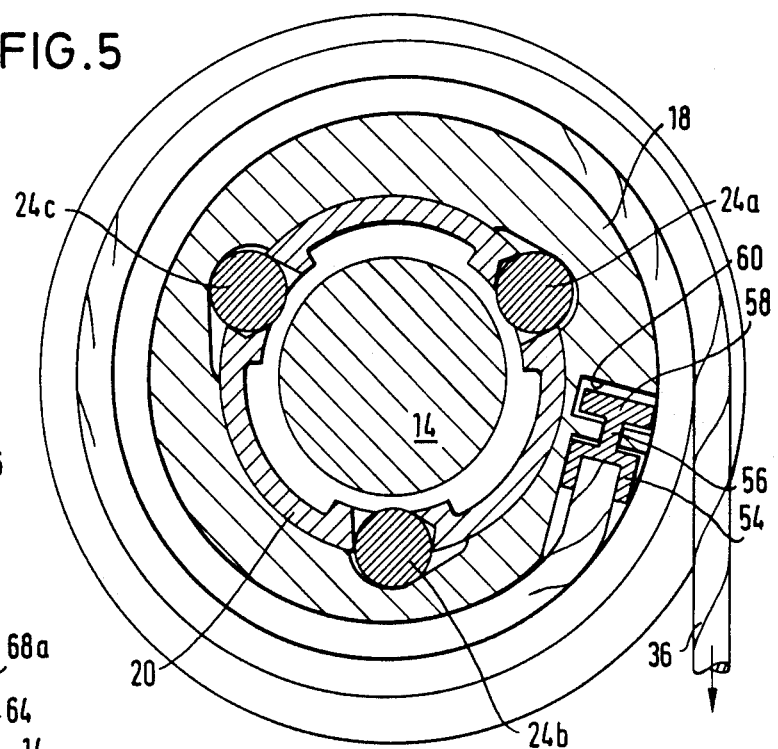
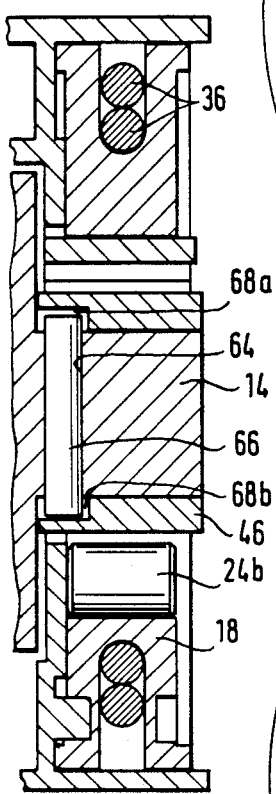
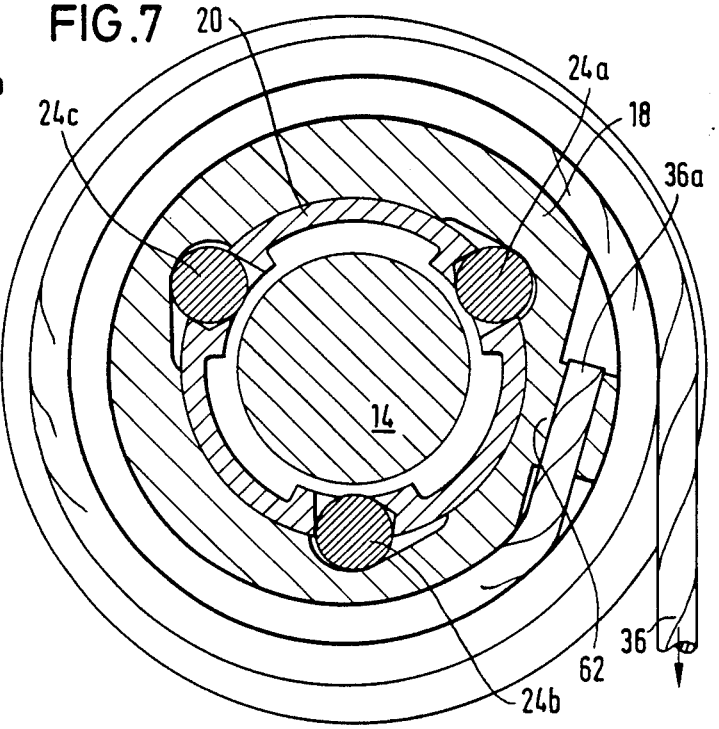

SAFETY BELT TAKEUP DEVICE WITH TIGHTENING MEANS

The invention relates to a safety belt takeup device with tightening means which for transmitting the tightening force to a takeup shaft comprises a rotatable roller or pulley is couplable to said takeup shaft via a coupling means and on the periphery of which the tightening force engages via tensioning means.

A safety belt takeup device of this type is already known from DE-OS No. 3,131,637. The tightening force is generated in this known safety belt takeup device for example by a pyrotechnical charge which is fired via an acceleration-sensitive sensor and propels a piston which is movably guided in a cylinder and to which one end of the tensioning means is secured. The pyrotechnical charge may be dimensioned so that the tightening force generated leads to the desired torque at the takeup shaft of the safety belt takeup device so that the safety belt is tightened with the desired tightening force.

If however the tightening force is to be generated by means which do not permit suitable dimensioning of the tightening force, or which require considerable expenditure for such dimensioning, there is a danger of the safety belt being excessively tightened on the body of the vehicle occupant with a corresponding risk of injury. For example, the tightening force can be produced by a mass which is movable relatively to the vehicle body and to which one end of the tensioning means is secured. When the vehicle collides with an obstacle the mass because of its inertia is displaced relatively to the vehicle body and thus generates the tightening force which is transmitted via the tensioning means to the rotatable roller and by the latter via the coupling means to the takeup shaft. Depending on the violence of the collision the tightening force thus generated can take on undesirably high values.

The invention is based on the problem in a safety belt takeup device of the type mentioned at the beginning of controlling with simple means the tension exerted by the tightening operation on the safety belt and in particular limiting said tension when the tightening force available for driving the takeup shaft can assume excessively high values.

This problem is solved in the safety belt takeup device of the type described at the beginning in accordance with the invention in that in the force transmission path between the tensioning means and the takeup shaft a limiting means is provided which limits the torque transferred to the takeup shaft. By the limiting means the torque effective at the takeup shaft is restricted to values at which in the course of a tightening operation no inadmissibly high tightening forces arise in the safety belt. Endangering of the vehicle occupants by inadmissibly high tension of the safety belt arising during the tightening operation is avoided with certainty even when the tightening force is derived from a mass which is displaced relatively to the vehicle body on collision of the vehicle and an obstacle and can fundamentally generate tightening forces of unlimited magnitude.

According to an advantageous embodiment of the invention the limiting means after reaching a predetermined torque value cancels the force-locking connection between the tensioning means and the takeup shaft. This embodiment is based on the idea that there is no risk of inadmissibly high tension forces in the safety belt until towards the end of the tightening operation after any belt looseness has been taken up because said belt is then tightened round the body of the vehicle occupant. The torque to be transmitted between the tensioning means and the takeup shaft then abruptly increases. A further tightening, even with limited tightening force, is then undesirable. By cancelling the force-locking connection between the tensioning means and the takeup shaft the tightening operation is terminated in this embodiment.

The limiting means is disposed depending on the embodiment either in the region of the coupling means between the rotatable roller and the takeup shaft or it is formed in that the securing of the free end of the tensioning means at the periphery of the rotatable roller is dimensioned in suitable manner so that it yields on reaching a load corresponding to the predetermined torque value. Particular further developments for the realization of these two variants of the invention are discussed below.

Further features and advantages of the invention will be apparent from the following description of various embodiments and from the drawings to which reference is made.

In the drawings:

FIG. 1 is a radial section of an embodiment of the safety belt takeup device according to a first variant;

FIG. 2 is an axial section of the same embodiment;

FIG. 5 is a radial section of an embodiment of a second variant of the safety belt takeup device;

FIG. 6 is an axial section of a further embodiment of the second variant; and

FIG. 7 is a radial section of a third embodiment of the second variant of the safety belt takeup device.

Figure 3:
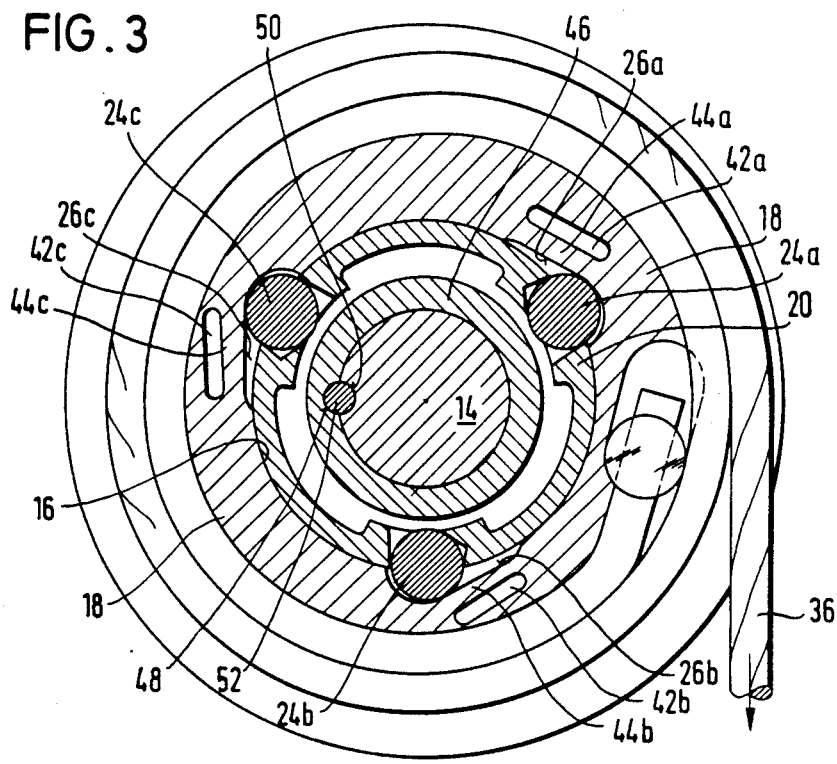
FIG. 3 is a radial section of a further embodiment of the first variant.

In the embodiment of the safety belt takeup device shown in FIGS. 1 and 2 a takeup shaft 12 is rotatably mounted in a housing 10. The takeup shaft 12 has a lateral extension 14 which projects through a bearing opening 16 of a rotatable disk-shaped roller 18. Between the bearing opening 16 and the lateral extension 14 of the takeup shaft 12 a generally hollow cylindrical cage 20 is disposed which is connected to the housing 10. The bearing opening 16 is provided at its inner surface with three recesses 22a, 22b, 22c whose form is approximately semicircular in cross-section and is adapted to the outer form of cylindrical rolling bodies 24a, 24b, 24c. Each of the recesses 22a, 22b, 22c terminates before completion of the semicircular cross-sectional configuration in a ramp-shaped face 26a, 26b and 26c respectively which in turn terminates in a recess 28a, 28b, 28c approximately semi-circular in cross-section and having a form similar to that of the recess 22a, 22b and 22c respectively. The rolling bodies 24a, 24b, 24c are held in radially through receiving openings 30a, 30b, 30c of the cage 20. The disk-shaped roller 18 is provided at its periphery with an encircling groove 32 which is closed outwardly by a laterally projecting peripheral wall 34 of the housing 10. Placed in the groove 32 spirally in a plurality of convolutions is a wire cable 36 serving as tensioning means. The inner end of the cable 36 is provided with a pressed-on nipple 38 which is engaged in a correspondingly shaped opening 40 of the rotatable roller 18. The other end of the cable 36, not shown in the drawings, is coupled to a mass which when a high deceleration of the vehicle in which the safety belt takeup device is installed occurs is displaceable relatively to the vehicle body to thereby generate the tightening force for the safety belt takeup device. Said mass may for example be the engine or transmission block of the vehicle. This embodiment of the safety belt takeup device operates as follows: When the vehicle collides with an obstacle by the movement of the mass to which the free end of the cable 36 is connected relatively to the vehicle body a high tension is exerted on the cable 36 in the direction of the arrow shown in FIG. 1. The tensile force exerted on the cable 36 engages the periphery of the rotatable roller 18 and generates a turning moment which tends to turn the roller in the clockwise direction. The superimposed convolutions cannot slide adjacent to each other in the axial direction in the groove 32 because the axial width of the groove 32 corresponds approximately to the cross-sectional diameter of the cable 36. Due to the turning moment now exerted on the roller 18 the 26a, 26b, 26c run onto the associated rolling body 24a, 24b, 24c and tend to turn the latter in the clockwise direction and press said body in the radial direction against the outer surface of the extension 14 of the takeup shaft 12. This entraining of the rolling bodies 24a, 24b, 24c is however resisted by the cage 20 fixed with respect to the housing. The cage 20 is however connected to the housing 10 via connecting means which when a predetermined torque or turning moment is reached yield and break so that the force-locking connection between the cage 20 and the housing 10 is cancelled. The rolling bodies 24a, 24b, 24c are now entrained in rotation by the roller 18 and simultaneously further pressed in the radial direction inwardly up to the outer surface of the extension 14. They then come into force-locking connection with said outer surface of the extension 14 so that the takeup shaft 12 is entrained. By the rotation of the takeup shaft 12 the webbing is coiled onto the belt reel, i.e. the safety belt is tightened. When towards the end of the tightening operation the webbing bears fixedly on the body of the vehicle occupant a sudden increase takes place in the resistance offered by the takeup shaft 12 to a further entraining rotation by the roller 18. Consequently, the ramp-like faces 26a, 26b, 26c run further onto the rolling bodies 24a, 24b, 24c and the faces engaging each other under pressure are deformed until the path for the rolling bodies 24a, 24b, 24c for yielding into the recesses 28a, 28b and 28c respectively is freed. The penetration of the rolling bodies 24a, 24b, 24c into the recesses 28a, 28b, 28c takes place when a predetermined torque value is reached between the takeup shaft 12 and the rotatable roller 18 corresponding to a tensile force acting on the periphery of the roller 18 via the cable 36 which leads to the desired tension of the safety belt engaging the body of the secured occupant. When the rolling bodies 24a, 24b, 24c have yielded into the recesses 28a, 28b, 28c the coupling engagement between the rotatable roller 18 and the extension 14 of the takeup shaft 12 is cancelled so that the roller 18, if the tensile force continues to act on the cable 36, is merely further rotated without entraining the takeup shaft 12.

A further particular feature of the tightening means of the safety belt takeup device resides in that on withdrawal of the cable from the rotatable roller 18 the effective diameter and the corresponding leverage thereof at which the tensile force acts becomes smaller so that with constant tensile force a torque is transmitted to the takeup shaft 12 which decreases with increasing rotational angle of the takeup shaft 12. At the start of the tightening operation high torque values are necessary, firstly to overcome the inertia of the parts to be set in rotation but secondly also to break the cage 20 away from the housing 10. For the further tightening operation until the webbing lies without slack on the body of the vehicle occupant to be secured smaller tightening forces are adequate. Thus, the construction described of the tightening means not only achieves a limitation of the torque transmitted to the takeup shaft but also a particularly favorable variation of the tightening forces acting on the webbing from the start of the tightening operation up to the end thereof.

The further embodiments differ from the embodiment described above only in the configuration of the limiting means limiting the torque transmitted to the takeup shaft. Consequently, only these limiting means will be described in detail.

In the embodiment shown in FIG. 3 the ramp-like faces 26a, 26b, 26c terminate relatively flat at the inner surface of the bearing opening 16 of the rotatable roller 18. Within the body 18 at a slight distance from each ramp-like face 26a, 26b, 26c there is an extended hollow chamber 42a, 42b, 42c which is separated from the adjacent ramp-like face by a web 44a, 44b, 44c. Due to their form and material the webs 44a, 44b, 44c are deformable so that the corresponding ramplike face 26a, 26b, 26c is deformed outwardly in the radial direction when it runs with high application pressure onto the corresponding rolling body 24a, 24b, 24c.

The deformation of the webs 44a, 44b, 44c results in a limitation of the radial application force of the rolling bodies 24a, 24b, 24c in the direction of the extension 14 of the takeup shaft 12 and consequently in a limitation of the torque which can be transmitted thereto. Although in this embodiment a limitation of the torque transmitted via the rolling bodies 24a, 24b, 24c takes place there is no cancellation of the coupling engagement when a predetermined torque limit value is reached.

A further particular feature of the embodiment shown in FIG. 3 resides in that onto the extension 14 of the takeup shaft a sleeve 46 is fitted which consists of deformable material. The sleeve 46 is provided at its inner surface with a semi-cylindrical recess 48 which supplements a likewise semi-cylindrical recess 50 at the outer surface of the extension 14 to give a cylindrical axial receiving bore for a coupling pin 52. By the coupling pin 52 the sleeve 46 is coupled fixed in rotation to the extension 14. Due to the deformability of the material of the sleeve 46 and/or coupling pin 52, however, the torque which can be transmitted between the sleeve 46 and the extension 14 is limited. When a predetermined torque limit value is exceeded in this embodiment as well the coupling engagement between the rotatable roller 18 and the takeup shaft is therefore cancelled. Furthermore, the deformable webs 44a, 44b, 44c and the deformable outer surface of the sleeve 46 cooperate in the sense of a limitation of the torque which can be transmitted via the rolling bodies 24a, 24b 24c.

Figure 4:
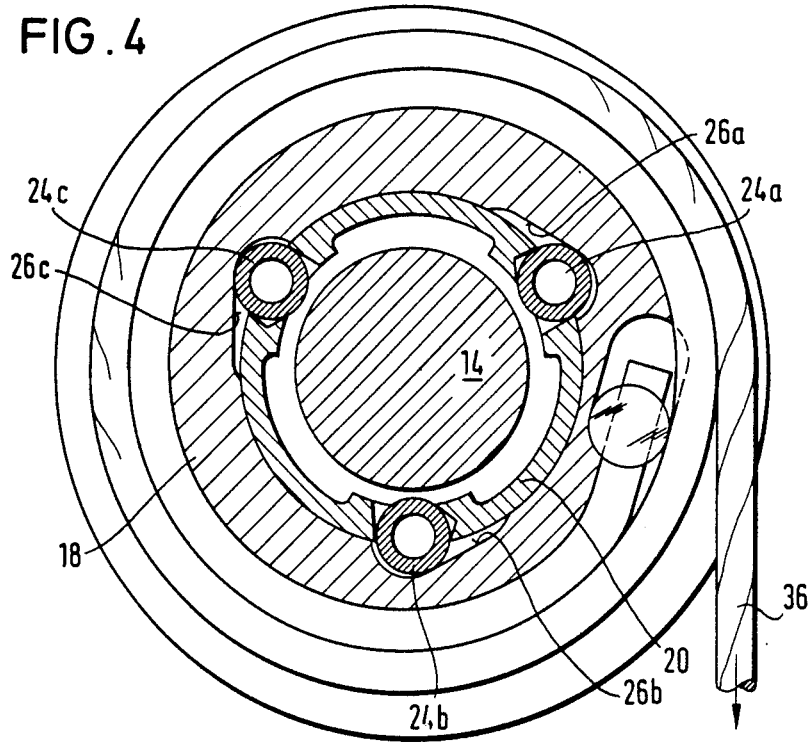
FIG. 4 is a radial section of a further embodiment of the first variant.

In the embodiment shown in FIG. 4 the rolling bodies 24a, 24b, 24c are hollow cylindrical and deformable due to the nature of their material. As soon as the ramp-like faces 26a, 26b, 26c run with adequate pressure force onto the outer surfaces of the rolling bodies 24a, 24b, 24c the latter are first urged in the radial direction inwardly against the outer surface of the extension 14 of the takeup shaft 12 incoupling engagement with the latter, the cage 20 thereby being sheared off the housing 10 when a predetermined strain is reached which corresponds to the predetermined torque limit value, but deformed and compressed in the radial direction, the torque which can be transmitted via the rolling bodies 24a, 24b, 24c to the takeup shaft 12 thereby being limited.

The embodiments according to FIGS. 5-7 correspond to a variant of the safety belt takeup device in which the limiting means for limiting the torque which can be transmitted to the takeup shaft are not disposed in the region of the coupling means between rotatable roller 18 and takeup shaft 12 but in the region of the connection of the cable 36 to the rotatable roller 18 (FIGS. 5-7) or in the region of the non-rotatable connection between the extension 14 of the takeup shaft and the sleeve 46 fitted onto the extension 14 (FIG. 6).

In the embodiment of FIG. 5 the end of the cable 36 is provided with a pressed-on nipple 54 which comprises a cylindrical portion 56 of reduced cross-section diameter and an anchoring head 58 which is received in a correspondingly formed anchoring recess 60 in the rotatable roller 18. The portion 56 of the nipple 54 is so dimensioned as regards strength that it tears off as soon as between the end of the cable 36 and the rotatable roller 18 a tensile force acts which reaches a predetermined limit value which corresponds to the predetermined limit value of the torque to be transmitted to the takeup shaft. After the tearing off of the portion 56 of the nipple 54 no force whatever is transmitted to the rotatable roller 18.

The embodiment of FIG. 7 is based on a similar principle but in this embodiment the end 36a of the tensioning cable 36 is calked in a cylindrical receiving opening 62 of the rotatable roller 18. In this embodiment as well the end 36a of the cable 36 detaches from the rotatable roller 18 as soon as the cable is practically completely unwound and the roller 18 opposes the further rotational movement with a resistance corresponding to the predetermined torque limit value which is to be transmitted to the takeup shaft.

In the embodiment according to FIG. 6, which is similar to that of FIG. 3, the non-rotatable connection between the sleeve 46 pushed onto the extension 14 and said extension 14 is established by a coupling pin 66 which is inserted in the radial direction into a bore 64 of the extension 14 and the ends of which engage in correspondingly shaped recesses 68a, 68b at the inner surface of the sleeve 46. The ends of the coupling pin 66 are adapted to be sheared off under a predetermined strain which corresponds to the limit value of the torque to be transmitted via the sleeve 46 and the extension 14 to the takeup shaft 12.

The measures provided in the various embodiments described for limiting the torque can be combined with each other. For example, in the embodiment according to FIG. 1 the anchoring of the end of the cable 36 to the rotatable roller 18 may be adapted in dimensions to detach itself under a predetermined strain. The combined features for limiting the torque increase the functional reliability of the belt takeup device.

I claim:

1. A vehicle passenger restraint system comprising:
    a safety belt;
    a safety belt retractor comprising a safety belt webbing takeup shaft having an axial extension; and
    a safety belt retightening means associated with said retractor and comprising:

pulley means mounted for rotation about said axial extension of said takeup shaft,
   pulling means engaging the periphery of said pulley means for rotating the same upon tensioning of the pulling means, said pulling means being tensioned in an emergency,
   coupling means for establishing a driving connection between said pulley means and said axial extension of said takeup shaft to rotate said takeup shaft and transmit a tightening torque thereto when said pulley means rotates upon tensioning of said pulling means, and
   means for limiting the tightening torque transmitted from said pulley means to said takeup shaft.

2. A vehicle pasenger restraint system as set forth in claim 1 wherein said limiting means comprises means for cancelling the driving connection between said pulley means and said axial extension of said takeup shaft upon the tightening torque reaching a predetermined magnitude.

3. A vehicle passenger restraint system according to claim 1 wherein said limiting means is disposed in the region of said coupling means between said pulley means and said axial extension of said takeup shaft.

4. A vehicle passenger restraint system according to claim 2 wherein said coupling means comprises a plurality of rolling bodies disposed in a radial direction between an outer surface of said axial extension of said takeup shaft and an inner surface of said pulley means, and said inner surface defines a plurality of recesses for receiving said plurality of rolling bodies and having ramp-like surfaces which urge said rolling bodies radially inward into engagement with said outer surface of said axial extension upon rotation of said pulley means, said drive connection cancelling means comprising a radially deformable surface area on at least one of said outer surface of said axial extension, said ramp-like surfaces of said inner surface of said pulley means, and said rolling bodies.

5. A vehicle passenger restraint system according to claim 4 wherein said radially deformable surface area is provided on said ramp-like surfaces.

6. A vehicle passenger restraint system according to claim 5 wherein said recesses in the area adjacent said ramp-like surfaces have a widening extending radially outward and adapted to the shape of said rolling bodies.

7. A vehicle passenger restraint system according to claim 4 wherein said pulley means comprises an elongated hollow chamber located radially outwardly from said ramp-like surfaces, and a web-like deformable wall separating said ramp-like surfaces from said hollow chamber.

8. A vehicle passenger restraint system according to claim 4 wherein said deformable surface area is formed by peripheral surfaces of said rolling bodies.

9. A vehicle passenger restraint system according to claim 8 wherein the rolling bodies are hollow cylindrical bodies.

10. A vehicle passenger restraint system according to claim 4 wherein said deformable surface area comprises an outer surface of a sleeve made from a deformable material and surrounding said axial extension of said takeup shaft.

11. A vehicle passenger restraint system according to claim 2 wherein said cancelling means comprises a sleeve surrounding said axial extension and a yieldable connecting element for fixedly connecting said sleeve to said axial extension, said connecting element yielding upon the tightening torque reaching the predetermined magnitude to disconnect said sleeve from said axial extension.

12. A vehicle passenger restraint system according to claim 11 wherein said axial extension has a radial bore extending therethrough and the inner surface of said sleeve is provided with two recesses facing opposite ends of said radial bore, respectively, said connecting member being a shearable pin received in said radial bore with the opposite ends of said shearable pin received in said two recesses, respectively.

13. A safety belt takeup device according to claim 11 wherein said axial extension and said sleeve have complementary axially extending recesses therein, and said connecting member comprises a coupling pin received in said complementary recesses to form a locking coupling between said sleeve and said axial extension, at least one of said axial extension, sleeve and coupling pin being deformable such that said sleeve is disconnected from said axial extension upon forces acting thereon reaching a magnitude corresponding to the predetermined magnitude of the tightening torque applied to said takeup shaft.

14. A vehicle passenger restraint system according to claim 1 wherein said tightening means comprises yieldable means for connecting said pulling means to the periphery of said pulley means, said yieldable means yielding when forces acting thereon reach a magnitude corresponding to the predetermined magnitude of the tightening torque to stop rotation of said pulley means.

15. A vehicle passenger restraint system according to claim 14 wherein said yieldable means comprises a connecting member having a cross-sectional reduction which breaks upon the forces reaching the predetermined magnitude.

16. A vehicle passenger restraint system according to claim 14 wherein said pulley means has an opening, and said pulling means has a free end detachably received in said opening.

17. A vehicle passenger restraint system according to claim 1 wherein said pulling means comprises a cable and said pulley means comprises a flat disc having a groove with an axial width corresponding to the cross-sectional diameter of said cable and formed on the periphery of said flat disc for receiving said cable, said cable having a plurality of convolutions spirally superimposed on each other.

18. A vehicle passenger restraint system according to claim 4 wherein said retightening means comprises a cage for holding said rolling bodies and a yieldable member for connecting said cage to the retractor housing, said yieldable member yielding upon forces acting thereon reaching a magnitude corresponding to the predetermined magnitude of the tightening torque.

* * * * *